United States Patent [19]

Lyle et al.

[11] Patent Number: 4,763,836
[45] Date of Patent: Aug. 16, 1988

[54] IRRIGATION SYSTEM FOR PRECISE WATER AND CHEMICAL APPLICATION

[76] Inventors: William M. Lyle, Rt. 1, Box 235, Ralls, Tex. 79357; James P. Bordovsky, 2004 W. 18th, Plainview, Tex. 79072

[21] Appl. No.: 909,727

[22] Filed: Nov. 7, 1986

Related U.S. Application Data

[63] Continuation of Ser. No. 537,897, Sep. 30, 1983, abandoned.

[51] Int. Cl.$^4$ .............................................. B05B 3/18
[52] U.S. Cl. .................................... 239/69; 239/243; 239/727; 239/733; 239/737; 239/739
[58] Field of Search .................. 239/69, 70, 727, 731, 239/732, 733, 734, 737, 739, 740, 225.1, 243

[56] References Cited

U.S. PATENT DOCUMENTS

| | | | |
|---|---|---|---|
| 3,394,729 | 7/1968 | Bower et al. | 239/710 |
| 3,445,066 | 5/1969 | Mohar | 239/199 |
| 3,587,763 | 6/1971 | Kinkead | 239/184 |
| 3,648,930 | 3/1972 | Brown et al. | 239/720 |
| 3,870,235 | 3/1975 | Newell | 239/177.1 |
| 4,172,551 | 10/1979 | Johnson | 239/711 |
| 4,266,732 | 5/1981 | Sage et al. | 239/731 |
| 4,358,055 | 11/1982 | Reinke | 239/711 |
| 4,397,421 | 8/1983 | Schram | 239/710 |

FOREIGN PATENT DOCUMENTS

| | | | |
|---|---|---|---|
| 41504/78 | 10/1978 | Australia . | |
| 224380 | 11/1942 | Switzerland | 239/164 |

Primary Examiner—Andres Kashnikow
Assistant Examiner—Michael J. Forman
Attorney, Agent, or Firm—Arnold, White & Durkee

[57] ABSTRACT

Apparatus for precise water and liquid chemical application to agricultural fields is provided comprising a control platform with two motors, each motor driving a separate set of drive wheels. The speed of the first platform motor being selectable, the speed of the second motor being controlled by a variable frequency AC motor controller which receives a signal from a linear position transducer which senses the positional relationship of the control platform to a pre-determined path so as to maintain the platform on a pre-determined path. A second variable frequency AC motor controller receives a signal from a second linear position transducer between the control platform and a plurality of span sections supported by a plurality of motorized, wheeled towers which is operable to maintain alignment between the towers and the control platform, and the span sections are provided with switches operable to switch the motors of the towers on and off momentarily as required to keep them in alignment with each other. Water and chemicals are transported independently along the span sections and into separate nozzle systems at appropriate pressures for dispensing, each span being provided with at least one chemical and one water nozzle system. The nozzles of each nozzle system may be oscillated vertically under direction of a programmable controller, and each nozzle system may be positioned horizontally along the span section. The chemical nozzle systems may be further directed by the programmable controller to dispense chemicals only from certain nozzle systems at any given time. The apparatus may be used for low energy precision application agricultural methods.

27 Claims, 8 Drawing Sheets

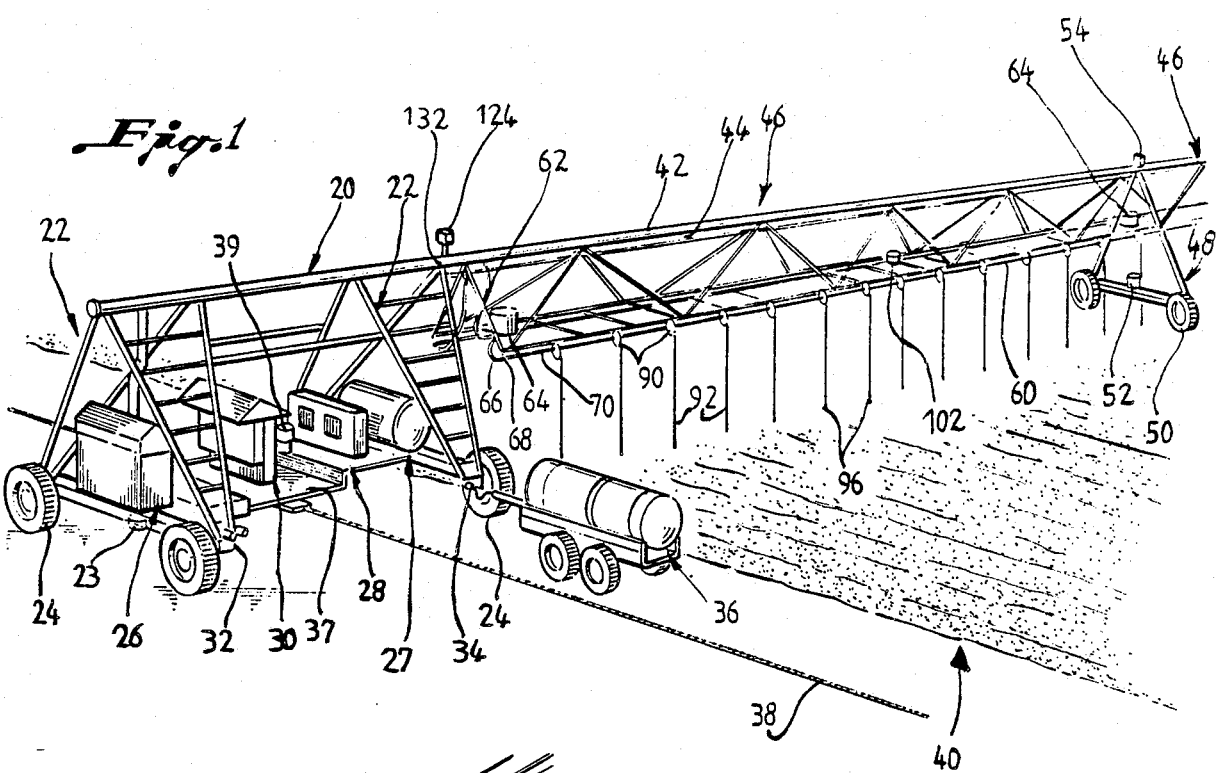
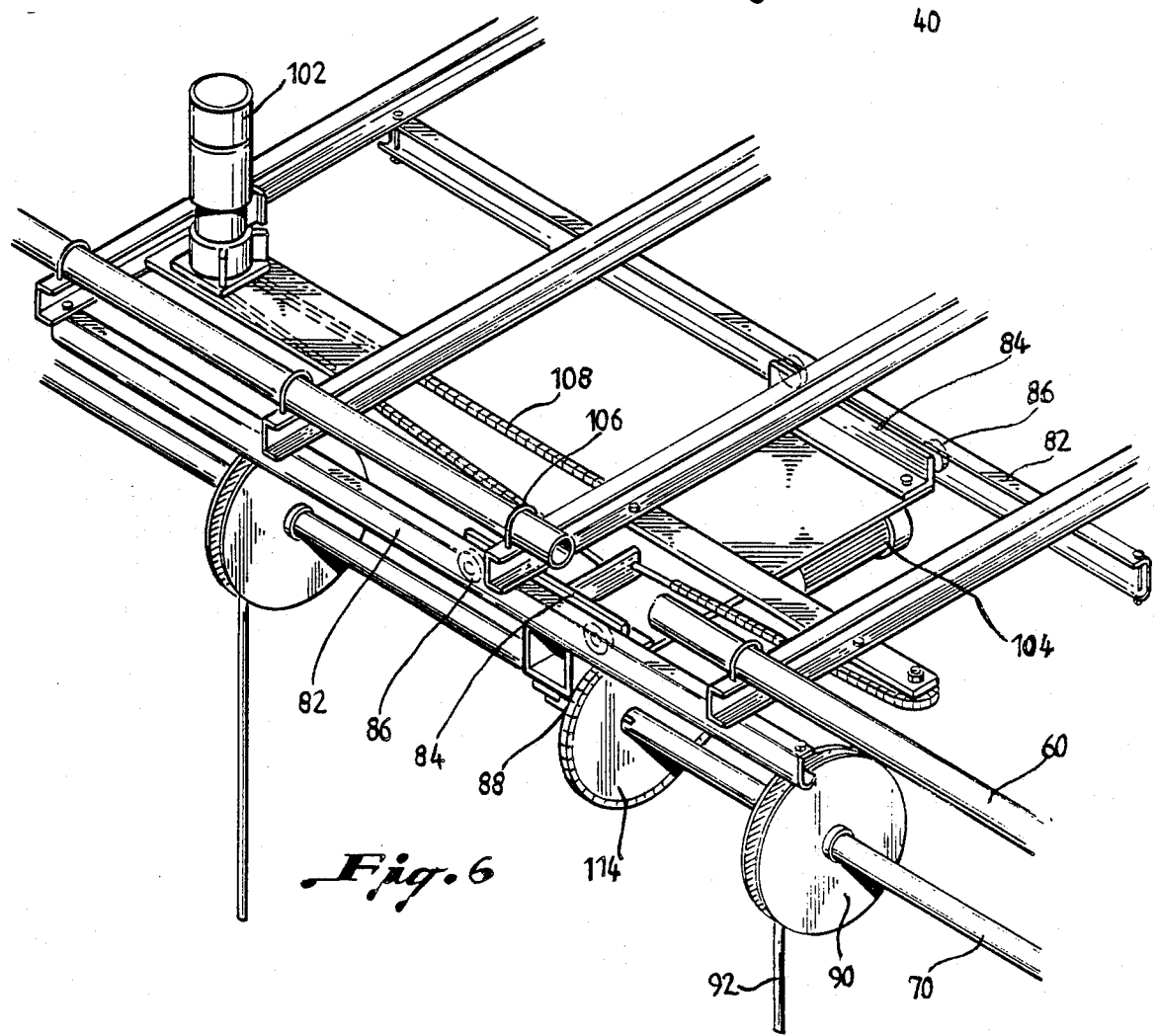

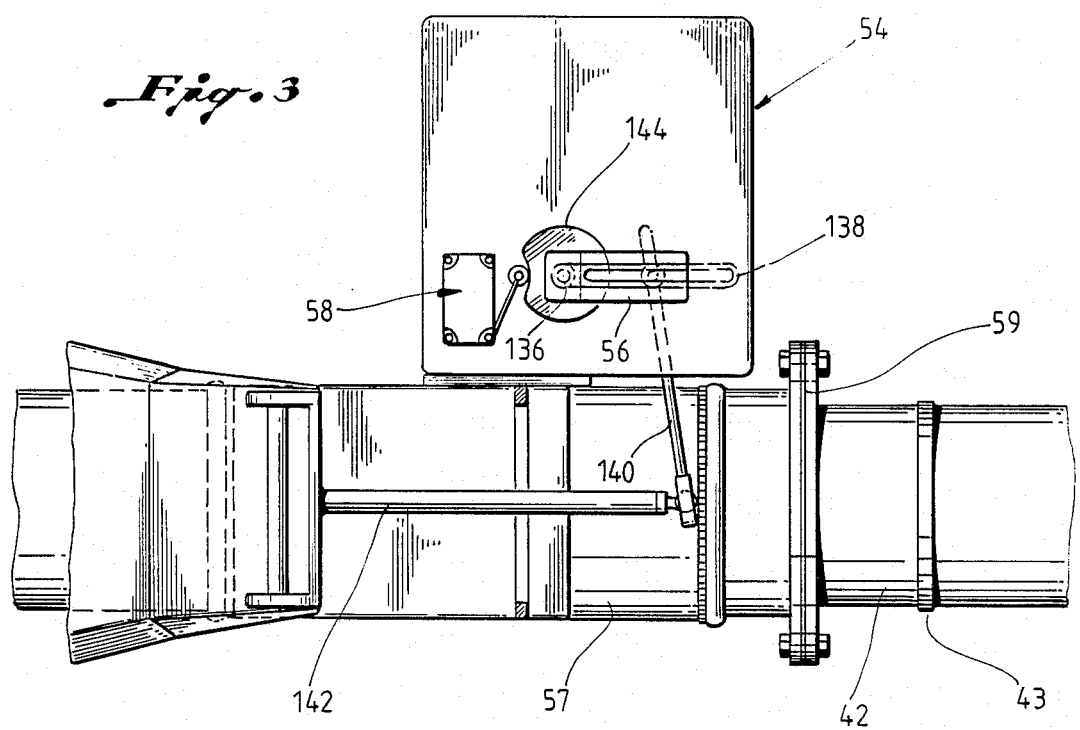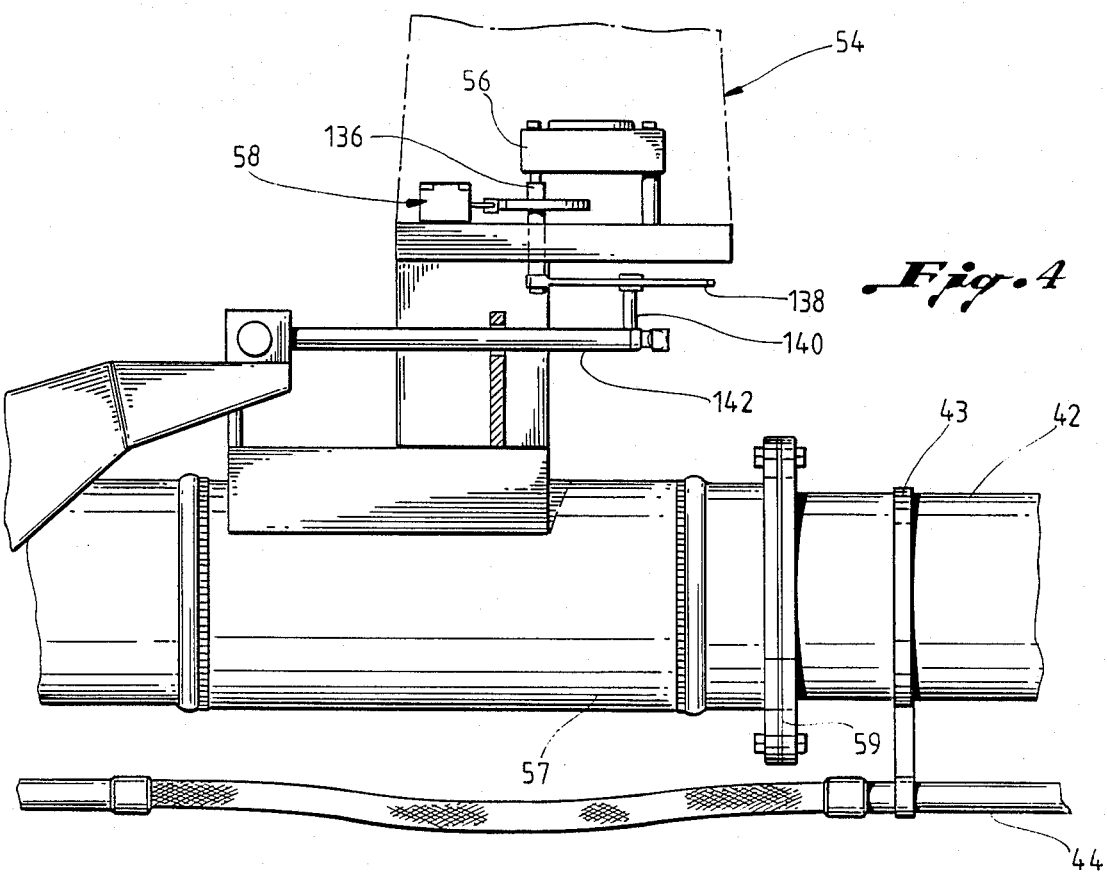

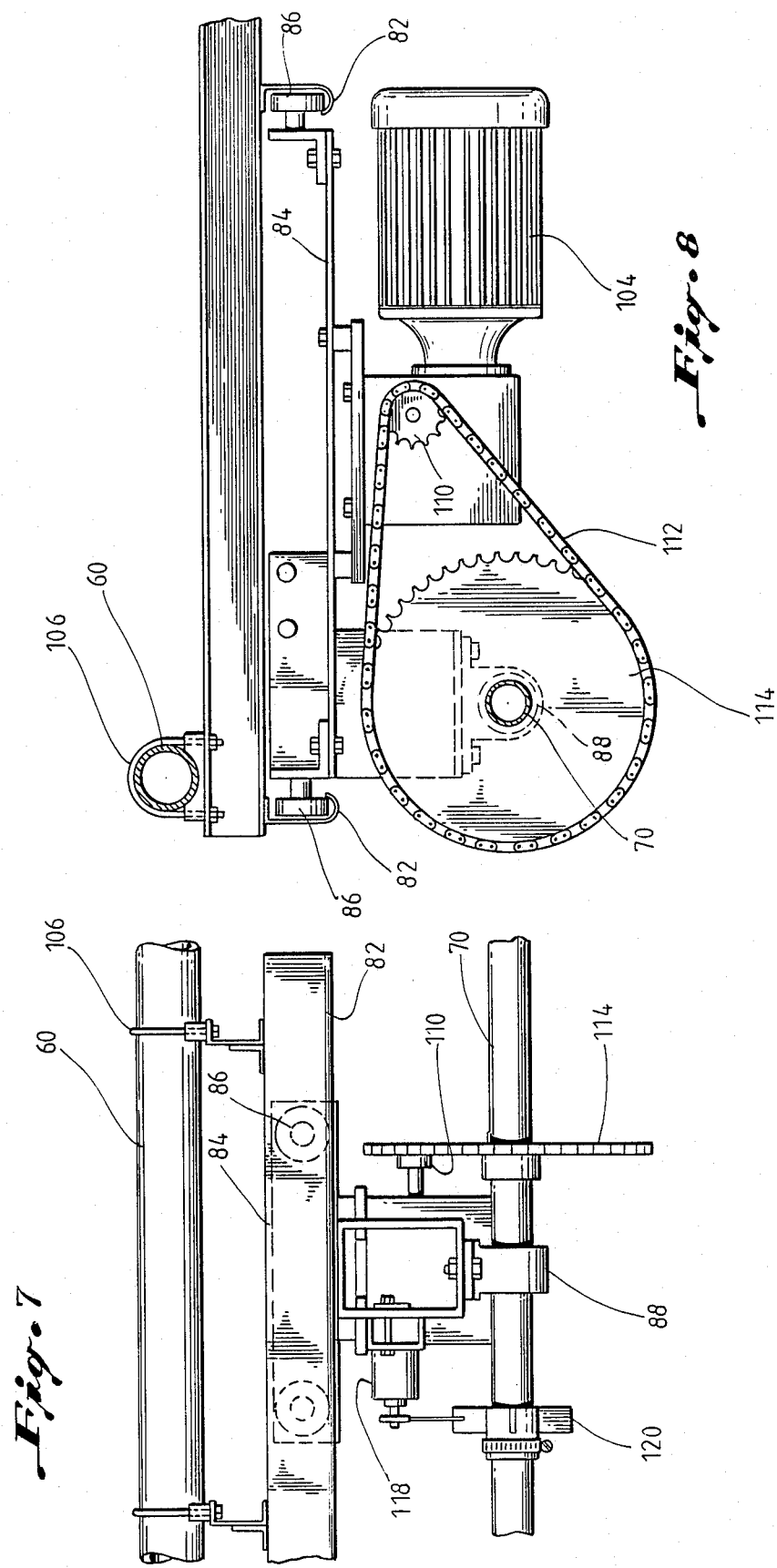

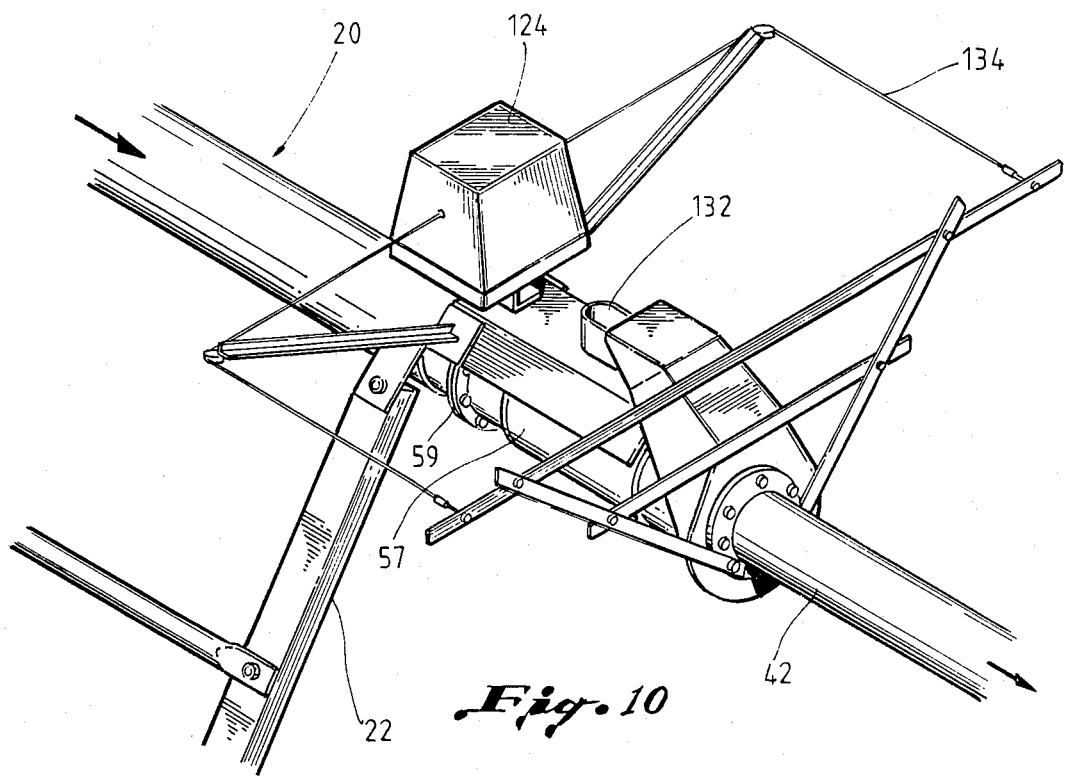
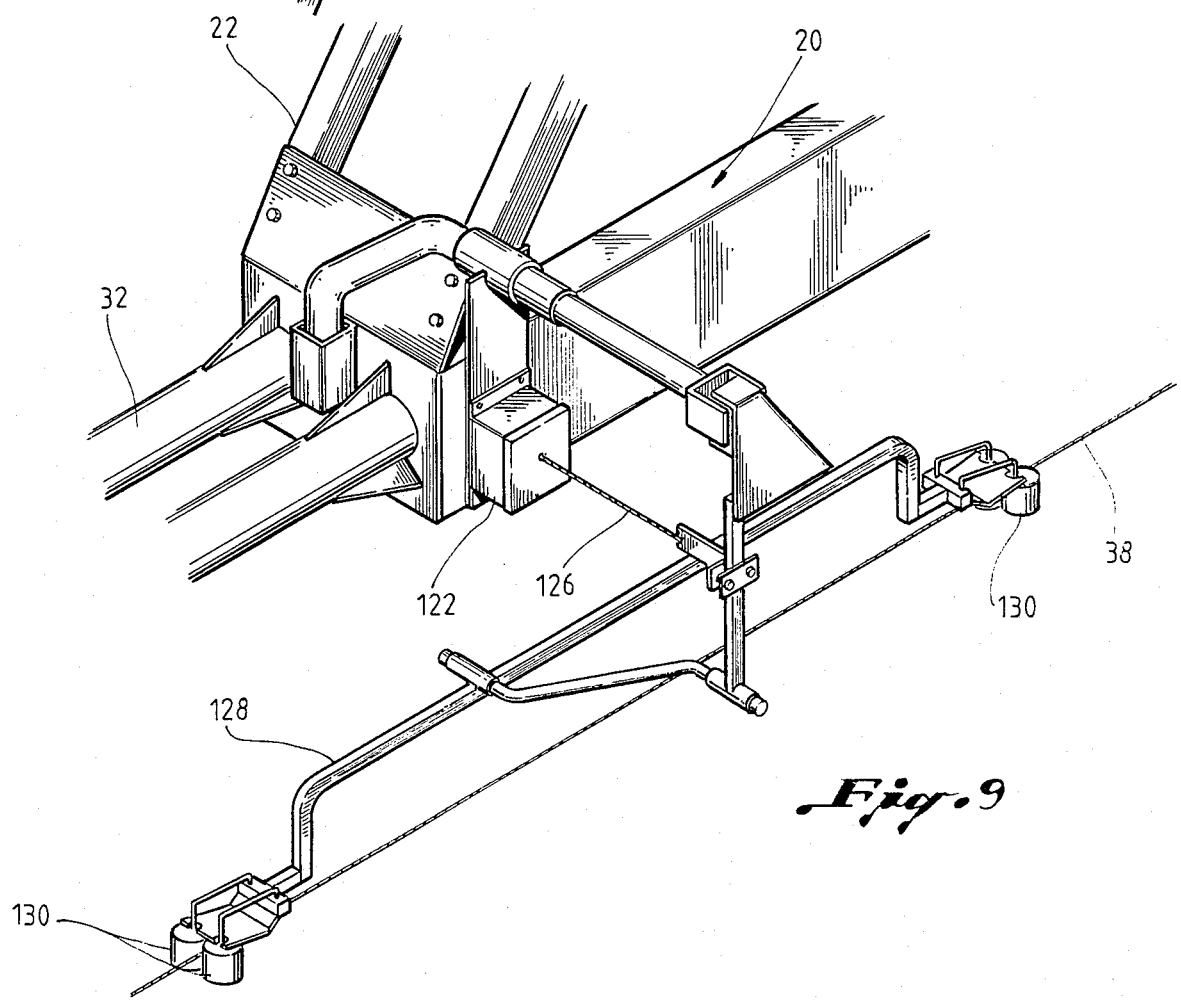

IRRIGATION SYSTEM FOR PRECISE WATER AND CHEMICAL APPLICATION

This is a continuation of application Ser. No. 537,897, filed Sept. 30, 1983, now abandoned.

BACKGROUND OF THE INVENTION

The present invention relates to an apparatus and method for the application of water and liquid chemicals to agricultural fields. More particularly this invention relates to an irrigation system, effective in low energy precision application techniques, which utilizes a programmable controller for the application of precise amounts of liquid chemicals and water.

New chemicals such as growth regulators, anti-transpirants and soil surface evaporation suppressants are being developed which may open new horizons in water conservation. However, the success of these chemicals in agricultural applications may depend upon the ability of the agriculturalist to make timely and accurate application of these chemicals in precise amounts at particular locations on the plant. In particular, new methods such as low energy precision application (LEPA) irrigation and low or no-till methods offer a number of advantages such as decreased energy consumption, decreased water usage and increased chemical efficiency over more conventional methods. In addition, the effectiveness of many chemicals currently being used in more conventional agricultural production may be increased by application by a system capable of precise, accurate application.

Current methods for the application of agricultural chemicals include aerial, ground and chemigation methods. These methods are, for the most part, incapable of the precise application of water and liquid chemicals necessary for LEPA methods in that they suffer from one or more of the following defects or limitations.

Application of chemicals with tractor-driven sprayers suffers from many of such defects. For instance, such application techniques are often limited by and untimely due to wet soil from irrigation or rainfall. Further, the necessity for driving a tractor through the field often results in foilage damage to the crop and unnecessary soil compaction in the wheel tracks.

Aerial application is particularly subject to many factors which may adversely affect coverage. These factors include dense crop canopies, high winds, atmospheric inversion layers, and poor regulation of the amount of liquid applied. Research has shown that a very low percentage of aerially-applied chemicals penetrate the canopies of some crops, and therefore these chemicals fail to reach the area of insect infestation. Aerial application is simply incapable of the precision of application required by LEPA methods.

Chemigation, the application of chemicals simultaneously while irrigating, has been accomplished with both surface and sprinkler systems. However, surface methods are limited to soil applied chemicals and the distribution uniformity which may be very low under certain circumstances, is no better for the chemical than that of the water which is applied. Chemicals that are injected directly into the irrigation water and applied through sprinkler systems are subject to the non-uniformity of the water application. This non-uniformity may be quite drastic in high wind conditions. Other problems in sprinkler-applied chemicals stem from the fact that a single nozzle, located above the crop canopy, is used to apply both soil-active chemicals and foliage-applied materials. The result is that the effectiveness of foliage-applied chemicals is decreased due to the washing by excess water which is simultaneously applied. Likewise, some soil applied chemicals are intercepted by leaves and are lost by volatilization.

These problems of non-uniformity and poor localization of the chemical being applied are compounded by the speed control and alignment of present electrically-driven irrigation systems. These systems use intermittent move-type systems controlled by a percent timer. For example, if a system is to move at 20% of its maximum speed, the timer could move it for 12 seconds out of a minute, and the system would then remain stationary for the remaining 48 seconds. Because it is stationary for a length of time, this type of irrigation system results in additional uneven chemical distribution, with the resulting decrease in effectiveness described above. In particular, this type of system is ineffective for LEPA methods, which are particularly dependent upon the uniform application of precise amounts of water and chemicals at a precise location into microbasins or above the furrow or the crop canopy.

SUMMARY OF THE INVENTION

This multifunction irrigation system applies both water and chemicals from the same basic pipe and tower structure while achieving the maximum application precision possible. Use of independent nozzle systems enables precise control of water and chemical application. Each nozzle system is adjustable in both the horizontal and vertical direction, and operates either manually or automatically under control of a programmed micro-processor. Discharge from the nozzles may also be switched on and off to provide flexibility in spraying.

Drive motors propel the irrigation system at a constant rate through the field. Linear position transducers detect misalignment of the system and allow guidance and alignment control. The correct track of the system is established by a control wire stretched on one side of the field, or similar means for establishing a straight guideline. The system is provided with a control platform with two separate three-phase AC drive motors, a sensing system, and means for varying the speed of these motors so that the control platform will proceed along a predetermined path. The control platform is connected to a number of interconnected span sections. Each section is supported along its length by motorized, wheeled towers. The towers are provided with switches and appropriate wiring operable to regulate the speed of the AC motors of these towers so as to maintain the span sections in lateral alignment as they move, along with the control platform, together the pre-determined path.

The system is provided with separate pipes for transporting water and liquid chemicals along the span sections. The pipes are connected to separate nozzle systems for dispensing the water and liquid chemicals along the length of each span. The nozzle systems are provided with separate motors and controls for independent positioning of the nozzle system of each span in a horizontal plane, and with separate motors and controls for independent positioning of the nozzles in a vertical plane. The motors and controls for positioning the nozzles in a vertical plane are effective to move the nozzles continually in that vertical plane over a desired distance in that plane for a desired period of time. The system is also provided with regulators to limit the amount of water and chemical dispensed by the water and chemical nozzle system and with valves for dispensing the liquid chemicals from the chemical nozzle system of desired span sections at any given time. The operation of the nozzle systems is at the direction of a programmable controller which may be programmed by the user.

To maintain the apparatus of the present invention upon a desired path, the guidance system utilizes a variable frequency AC motor controller and a positional sensor to obtain a differential between the speeds of two AC motors which are located on the two sides of a control platform. Each AC motor drives a set of drive wheels independently, thereby directing the platform away from or back toward the desired path. The correct path may be determined by a straight wire stretched on one side of the field, by a shallow trench or other method. The first motor is set to obtain the desired constant speed at which the system advances along the field by means of an operator-controlled AC motor controller. A low voltage signal from the first motor passes through a first signal interface. Here, a ratio factor is applied to the low voltage signal, modifying the signal, and then to a first variable frequency AC motor controller and on to a second motor on the opposite side of the control platform. The ratio is adjusted by a potentiometer which is located in series with a linear position transducer which also incorporates a potentiometer.

The linear position transducer senses the distance between the control platform and the predetermined path. If the control platform is moving along the desired path, then the speed of the second motor is the same as that of the first motor. If the control platform is moving away from the path in a direction toward the field, then the ratio is increased. This increases the signal voltage to the first AC motor controller, thereby increasing the speed of the second motor relative to the first motor. The second motor may likewise be slowed down by the changed signal if the platform is moving away from the predetermined path in the other direction.

The numerous spans of pipe and their motorized, wheeled supporting towers are connected to the platform by means of a slip joint. The tower motors are controlled as a group by a signal from a second variable frequency AC motor controller. This signal is changed by a position sensing transducer located at the slip joint between the pipe and towers and the control platform. Movement in or out of the slip joint, or a change in the angle between the pipe and the control platform, is translated through this transducer to a second signal interface, where it is applied to a signal from the second platform motor, and on to the second AC motor controller in a manner similar to that previously described, which either speeds up or slows down all the tower motors to the frequency and speed necessary to maintain them in alignment with the control platform along the desired path.

Because each tower motor is operated at the same, constant speed, tower misalignment is minimized. However, differences in the soil conditions at each tower and the effect of the soil conditions on slippage of the wheels of that tower may cause a tower to become misaligned from time to time. Should a tower fall behind, switches on the adjacent span sections sense the fact that these adjacent span sections are ahead of the slipping tower, causing the motors of the adjacent towers to stop until the lagging tower returns to a straight alignment. Once the correct alignment is re-established all the tower motors are switched off, then the switches are reactivated and all the motors are accelerated uniformly to the original, constant speed. The length of the time delay may be under three seconds so as to minimize the time that the towers are not moving uniformly at equal speed.

All motor controllers are equipped with electronic reversing. Consequently when the system reaches the end of the field, the switches may be thrown to reverse the three-phase motors, the chemical tank is moved around to the other side of the control platform and hitched to it, the water hose is coupled to the control platform on the other side, and the system may make a pass down the field in the other direction. The separate water and chemical nozzle systems are supplied by manifold pipe systems which are suspended from the lower chord of the truss which supports the span sections. The water and chemical nozzle systems and their respective manifold pipes are suspended on a track and trolley arrangement to allow for the independent, horizontal positioning of the nozzle systems.

Vertical nozzle positioning is achieved by rotating the manifold pipes and winding the flexible drop tubes to which the nozzles are attached up or down to the desired height. The water or chemical is fed into the corresponding manifold pipe continually during rotation. Both the chemical nozzle system and the water nozzle system can be controlled, independently of each other, in an automatic mode. The vertical amplitude and position of the oscillation of the nozzles and the time interval between each direction reversal of the water nozzle system are controlled by a programmable controller.

In addition to being capable of being controlled in the same manner as the water nozzle system with respect to the vertical positioning, the chemical nozzle system may be programmed so as to synchronize a spray cycle to match a desired nozzle movement (i.e., the chemical is dispensed only on the down stroke, the up stroke, or both). In addition, the chemical nozzle system may also be operated such that the chemical is dispensed from the nozzles of an individual span section separately in sequence in a cascade system. When operated in this manner, the nozzles of each span section spray in sequence until the last span is reached, then the system cycles back to the first span to start another cycle. Operation of the system in this mode may be coordinated with the vertical spray direction control. When operated in the cascade mode, the amount of water necessary for chemical application is significantly decreased.

The apparatus of the present invention provides a lateral-move irrigation system capable of advancing through the field at a constant slow rate and applying precise amounts of water (primarily by the LEPA irrigation method) and liquid chemicals at specific locations on the plant or soil, thereby allowing for the application of water and agricultural chemicals for maximum effectiveness. Such a system allows much lower application rates of both water and chemicals because of the precise placement and the improved timeliness of the application.

The present apparatus may totally eliminate some pesticide applications. For instance, the ability of the apparatus to oscillate the nozzles through specific sections of a crop canopy may result in the pests of some crops being removed entirely by mechanical washing.

The apparatus may be used effectively in no-till farming techniques, with resulting economic benefits to the farmer, along with decreased soil compaction and tractor fuel usage resulting from a decreased number of tractor applications.

Water efficiency is increased by the use of the apparatus for applying water by LEPA irrigation methods, resulting in energy savings from low pressure irrigation and reduced irrigation rates. Other substantial water savings are projected from the improved capability to apply water conserving-type chemicals such as evaporation and transpiration suppressants or growth regulators. LEPA irrigation has the potential to reduce the run-off from agricultural land, thus reducing the possibility of nonpoint pollution from erosion. Further, the relatively light, frequent irrigations will decrease the leaching of nitrates, soil amendments and pesticides into underground aquifers.

BRIEF DESCRIPTION OF THE DRAWINGS

FIG. 1 shows an irrigation system constructed in accordance with the present invention in place at the edge of a field from above and behind the system. For purposes of clarity, some details were omitted and only the water application nozzle system is shown.

FIG. 3 is a detail drawing of the system looking directly down on one of the junctions of the span sections. For purposes of clarity, the motorized tower and the chemical and water application systems are not shown, the cover of the tower switchbox has been removed, and the details of the wiring are not shown.

FIG. 4 is a side view of the detail shown in FIG. 3.

FIG. 6 is a detail of FIG. 5, showing a perspective of the vertical and horizontal positioning systems from above and behind the center of a span section.

FIG. 7 is a detail of the vertical positioning system looking at it from directly behind the center of a span section.

FIG. 8 is a side view of the vertical positioning system of FIG. 7.

FIG. 9 is a perspective view of the control platform guidance system looking at it from above and in front and from between the two vertical supports of the control platform.

FIG. 10 is a perspective view of the slip joint at the junction of the control platform and the first span system from above and behind the system.

DETAILED DESCRIPTION OF THE PREFERRED EMBODIMENTS

Figure 2:
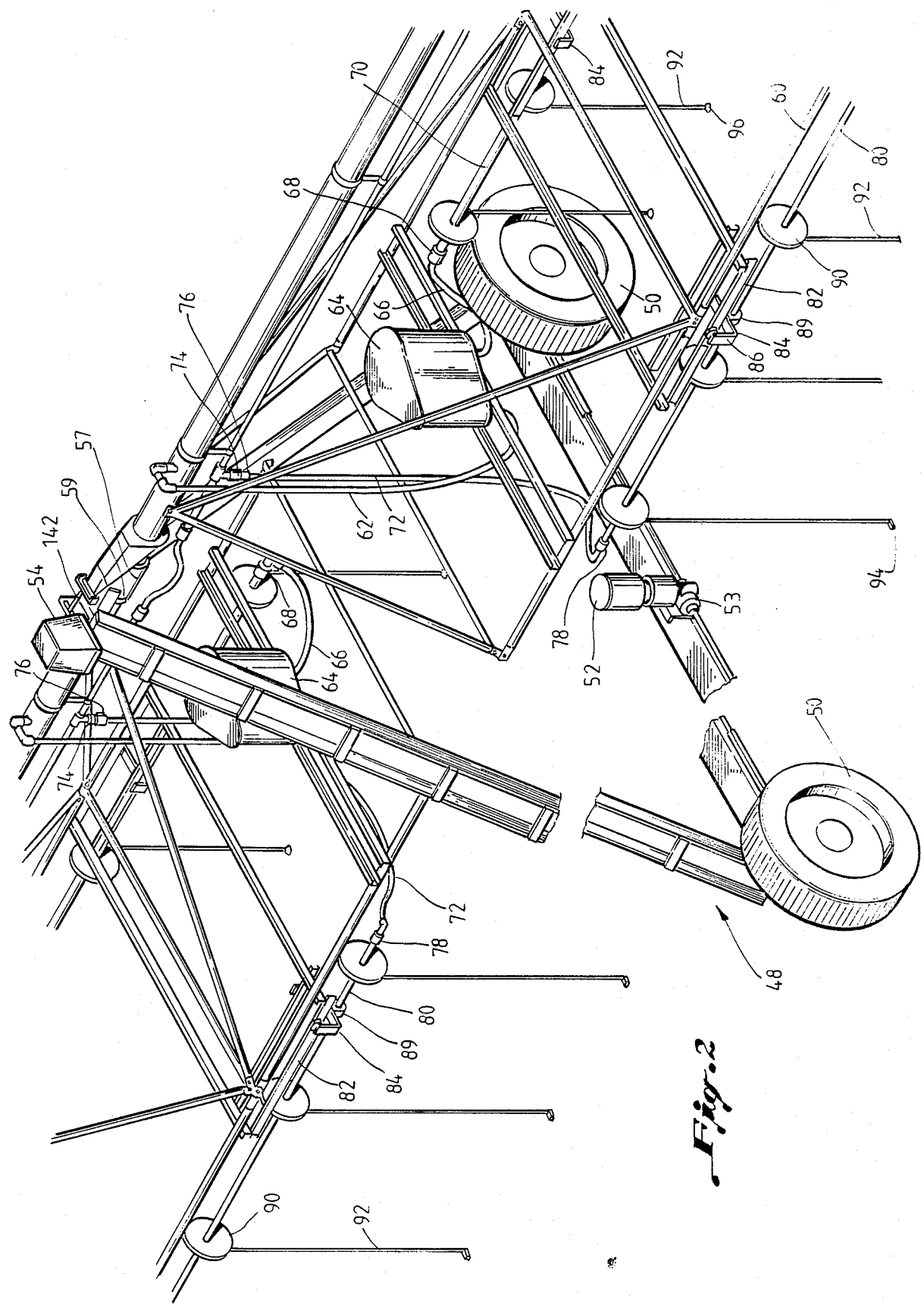
FIG. 2 is a perspective from above and in front of the system showing the details of the system at one of the motorized towers.

Referring now to FIG. 1, the control platform is indicated generally at 20. It consists of a pair of vertical supports 22 on each side of the control platform 20. Each side of the control platform 20 is provided with a motor 23 to drive the wheels 24. The control platform 20 is also provided with a power package, indicated generally at 26, comprised of an air-cooled diesel engine and a 480 volt, single phase generator. In addition, a water supply pump is located in close proximity to the power package 26 and coupled with the engine through an eddy current clutch. The generator supplies power to all the pumps and motors of the system, including the chemical water pumps which are also located in close proximity to the power package 26 and likewise not shown in specifics. A fuel tank for the diesel fuel is provided at 27. The control platform 20 is also provided with control panels 28 and 30. Although the various components of the necessary controls may be located wherever convenient, generally control panel 28 contains the spray nozzle controls and the speed and guidance controls are located on the control panel 30. The control platform 20 is also provided with two sets of dual couplers 32 for attachment of the water hose to either the front or the back side of the control platform, and with hitches, couplers and a hose, indicated generally at 34, through which the liquid chemicals pass into the control platform 20 from a chemical tank 36. Concentrated chemical may also be injected into either the water line, the chemical line, or both lines directly from a container (or containers) placed on the floor 37 of the control platform 20 by two micrometer-controlled diaphragm injection pumps, indicated generally at 39. Injection capability ranges from 0.05 gallons per hour (gph) to 200 gph from each pump.

Water is supplied to the system from a series of water valves spaced along one side of the field, and the dual couplers 32 are provided so that the water hose from one valve may be attached while the hose from the previous valve is also attached so that the system need not be stopped to switch hoses. Water couplers 32 are provided on both front and back sides of the control platform 20 so as to facilitate the reversal of the system when it reaches the end of its pre-determined path.

The path of the control platform 20 is determined by guidewire 38. As the control platform advances along the edge of field 40, water and liquid chemicals are delivered to the control platform 20 through couplers 32 and 34. Irrigation water is pumped through coupler 32 into the water pipe mainline 42, and liquid chemicals are pumped into the chemical mainline 44, out along the span sections, indicated generally at 46, over the field 40.

Referring also to FIG. 2, the span sections 46 are supported at regular intervals by motorized towers 48, each motorized tower 48 having two wheels 50 which are powered by a one-horsepower three-phase alternating current (AC) drive motor 52 with right angle and planetary gear reduction 53. Attached to the top of the tower is the tower switchbox 54, shown in detail in FIGS. 3 and 4, which contains the limit switch 56 and safety switch 58 for sensing and correcting misalignment of the towers.

To facilitate the relative movement between the control platform 20 and span sections 46, and between the span sections 46 at the motorized towers 48, the water pipe mainline 42 is provided with flexible inserts 57, secured into the water pipe mainline 42 by gaskets 59 bolted in place.

Suspended from the water pipe mainline 42 is the lower chord 60 of the truss which supports the span sections 46 which in turn supports the rest of the nozzle systems. Attached to the water pipe mainline 42 is a water supply hose 62 which feeds the water to a water flow control regulator 64. A second water supply hose 66 then takes the water out of the water flow control regulator 64, through the water rotating slip coupler 68, and thus into the two-inch inside-diameter rotatable water manifold 70.

Suspended from the water pipe mainline 42 by brackets 43 is the chemical mainline 44. Attached to the chemical mainline 44 is a chemical supply hose 72, which is provided with a pressure regulator 74 which keeps the pressure of the liquid chemicals at approximately 30 pounds per square inch. Directly attached to the output of the pressure regulator 74 is a solenoid valve 76. The flexible chemical supply hose 72 through which the liquid chemicals move to the rotating slip coupler 78 is attached to the one-inch inside diameter rotatable chemical manifold 80.

Figure 5:
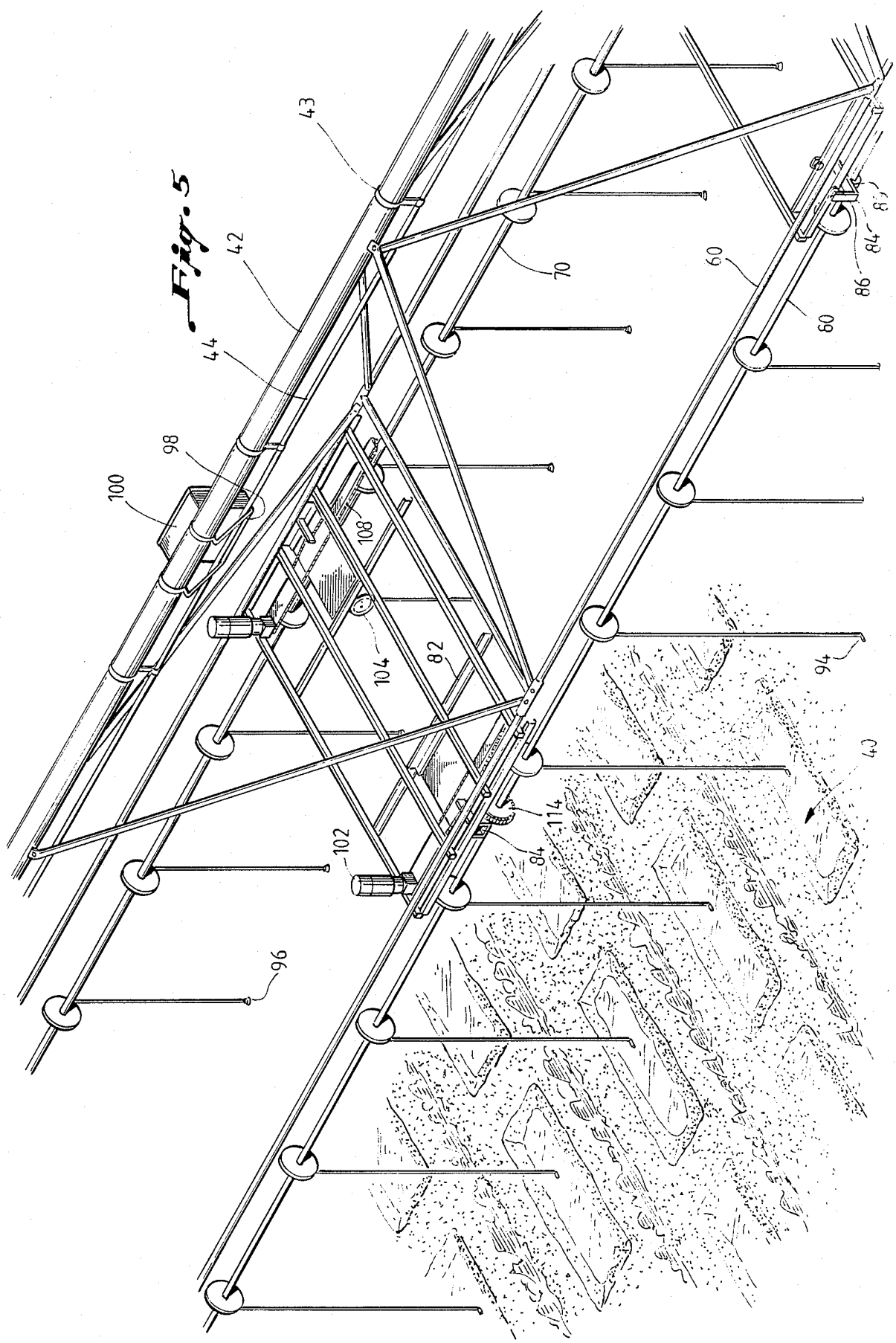
FIG. 5 shows the center of a span section in perspective from above and in front of the system.

Referring also to FIGS. 5 and 6, both the chemical 80 and the water rotatable manifolds 70 are suspended from the lower chord 60 of the span sections 46 by means of a track 82. A trolley 84 is provided with rollers 86 to enable the trolley 84 to move along the track 82. The trolley 84 is also provided with bearings 88 in the middle of the span section 46 and additional bearings 89 at regular intervals along the manifolds to support the rotatable water 70 and chemical 80 manifolds. Both water 70 and chemical 80 rotatable manifolds have attached to them a plurality of hose reels 90, evenly spaced along the manifolds. Wound on each reel 90 and attached to the manifolds are flexible drop tubes 92 for both water 70 and chemical 80 rotating manifolds. Water or chemicals flow into the flexible drop tubes 92 from the water 70 and chemical 80 rotatable manifolds by means of slip couplers located inside each of the reels 90. Each flexible drop tube connected to the chemical rotatable manifold 80 has attached to the end of it a low volume nozzle 94 with a 15 pound per square inch check valve. Each flexible drop tube attached to the rotatable water manifold 70 has on the end of the tube a 360 degree spray nozzle 96. As used in the above description, the term "nozzle system" refers to that portion of the irrigation system comprising the flexible supply hoses, flow and pressure regulators, slip couplers, rotatable manifolds, reels, flexible drop tubes, and the nozzles for dispersement of the water or chemical.

Referring now to FIGS. 5 and 6, attached via brackets 98 to the water pipe mainline 42 is the span switchbox 100 which receives the electrical signals from the control platform 20 and sends those signals to the 1/5 horsepower horizontal positioning motors 102 and the ¼ horsepower vertical positioning motors 104. The track 82 is secured to the lower chord 60 of the span sections 46 with U-bolts 106. The horizontal positioning motors 102 are attached to the trolley 84. The horizontal positioning motor 102 moves the trolley 84 by means of a chain or a belt drive 108 along the track 82 on the rollers 86. Attached to the bottom of the trolley 84 and shown in detail in FIGS. 7 and 8 is the vertical positioning motor 104 which by means of the small sprocket 110, the chain 112, and the vertical drive sprocket 114 on the rotatable water 70 and chemical 80 manifolds, turns the rotatable manifolds. The rotatable manifolds are supported by a bearing 88 in close proximity to the vertical drive sprocket 114 and by the bearings 89 previously noted that are located at regular intervals along the manifolds.

A switch 118 attached to the underside of the trolley 84 feeds the signals received in the form of counts of the flapper 120 attached to the rotatable water manifold 70 to the up-down counter of the programmable controller and is used in conjunction with the drum timers of the programmable controller to regulate the vertical amplitude of the oscillations and as a safety device to prevent damage to the nozzle systems. A similar flapper and switch is provided on the rotatable chemical manifold 80. If enough counts are not received within a certain time period, the programmable controller automatically shuts off power to the vertical positioning motors 104. The horizontal movement tracks 82 are all provided with limit switches to sense when the trolley 84 has reached either end of the horizontal movement track 82. These limit switches shut off the power to their respective horizontal positioning motors 102.

In operation, the speed at which the system advances along the field is determined by setting a speed selector on the speed and guidance control panel 30. This speed selector sets the speed of the first control platform motor. The first control platform motor sends a signal to a first signal interface. At that interface, the signal is modified according to the input from a ratio adjust which is set manually and the input from the platform guidance linear position transducer 122, attached to the underside of the vertical support 22 on one side of the control platform 20, and best shown in FIG. 9, which incorporates a reel-type ten-turn 5,000 ohm potentiometer. One end of the wire 126 of that reel-type potentiometer is connected to a pivoting cross 128 which has at either end of the horizontal ends of the cross 128 a pair of rollers 130 through which the guidewire 38 may pass. The exact construction of the various components here described may be in accordance with any of the well known commercial designs presently available on the market. The signal from the first signal interface, as modified, is sent to a first variable frequency AC motor controller, which controls the speed of the second control platform motor. If the control platform 20 moves away from the correct forward movement of the control platform along the path indicated by the guidewire 38 in the direction toward the field, then the wire 126 of the reel-type potentiometer begins unwinding, thus increasing the signal voltage to the first variable frequency AC motor controller which in turn increases the speed of the second motor. As the speed of the second motor increases, the control platform 20 moves back towards the correct path. If the control platform 20 moves away from the pre-determined path in a direction away from the field, the wire 126 of the platform guidance linear transducer's potentiometer reels in, thereby decreasing the voltage signal to the first variable frequency AC motor controller and thus slowing down the second motor of the control platform 20.

The first variable frequency AC motor controller sends a signal to a second signal interface. The second signal interface also receives inputs from a ratio adjust which is set manually and the tower guidance linear transducer 124 at the three-inch slip joint 132 which connects the water pipe of the platform 20 with the water pipe mainline 42, best shown in FIG. 10. A change in the angle between the water pipe mainline 42 and the control platform 20 causes the wire 134 of the tower guidance linear transducer 124, which incorporates a reel-type ten-turn 5,000 ohm potentiometer, to wind in or out on the potentiometer. The winding and unwinding of the potentiometer causes the second signal interface to raise or lower the signal going to the second variable frequency AC motor controller, thus increasing or decreasing the speed of the tower motors 52 as appropriate.

FIGS. 3 and 4 show the operation of the limit switches 56 to correct misalignment of the motorized towers 48. Applicants have utilized Cutler Hammer E 50 limit switches to advantage, but any limit switch which performs the same function could be utilized. The rotating shaft 136 of the limit switch 56 has attached to it a slotted switch extension arm 138 which moves by means of a connecting rod 140 and an actuating arm 142 in accordance with any forward or backward misalignment of adjacent span sections 46. The limit switch 56 functions as two limit switches in one housing so that there is one circuit for forward movement of the system and another, separate circuit, for movement in reverse. Regardless of whether the system is moving in a forward or reverse direction, when a tower falls behind, the shafts 136 of the switches 56 on the adjacent towers rotate, causing the motors of the adjacent towers to stop until the lagging tower returns to the correct alignment. Once the correct alignment is reestablished, all of the motors 52 of all the motorized towers 48 are stopped. Their circuits are then reactivated and the towers are accelerated uniformly to the original constant speed. If a tower moves ahead, the shaft 136 activates the circuit and likewise causes the tower motor of that particular tower to stop, allowing the other towers to catch up. The stopping and starting of the tower motors occurs within three seconds so as to minimize the amount of time that any single tower is not moving at a constant rate down the field. It will be noted that attached to the rotating shaft of the switch 136 is also a cam 144 which closes a safety switch 58 if the misalignment of towers 48 becomes too great, thereby shutting off all motor controllers and motors 52.

Each span switch box 100, located in the middle of each system span 46 contains a set of nine relays which provide for the independent and separate functioning of the horizontal positioning motors 102 and the vertical positioning motors 104. The programmable controller located on the control platform 20 is equipped internally with various drum timers, timers and counters. The programmable controller allows both the chemical nozzles 94 and the water nozzles 96 to oscillate up and down in a predetermined vertical plane with a desired amplitude of oscillation. The oscillations of the chemical 94 and water 96 nozzles are controlled independently of each other. The vertical nozzle movement can be done simultaneously in all the span sections 46, sequentially in each, or alternately (i.e., all nozzles in spans 1, 3, and 5, then all nozzles in spans 2 and 4).

The solenoid valves 78 for chemical nozzle system are synchronized with the vertical travel interval of the flexible drop hoses 92 on the chemical rotatable manifold 80 thus allowing spraying while the nozzles 94 are on the upstroke, the downstroke, or both. The programmable controller can also be programmed to operate the solenoid valves 78 in each individual span section separately in a cascade system. In this operating mode, the chemical is sprayed from the nozzles 94 in each span section individually in sequence until the last span section is reached. After the appropriate, selected time interval, the nozzle system of the last span section shuts off and the nozzle system of the first span section begins spraying, starting another cycle. The programmable controller also has a timer for each span section. The timer is used to delay the turning off of the vertical positioning motors 104 after the flexible drop hoses 92 have been reeled to the highest vertical position in order to better position the flapper 120 attached to the rotatable water 70 and chemical 80 manifolds in relation to the switch 118 which sends the counting signal to the counter of the programmable controller at the control platform 20. Another timer in the programmable controller sets the time each solenoid valve 78 stays on when the parasol nozzles 94 are not moving up and down. This timer can be programmed from one second to several hours.

Figure 11A:
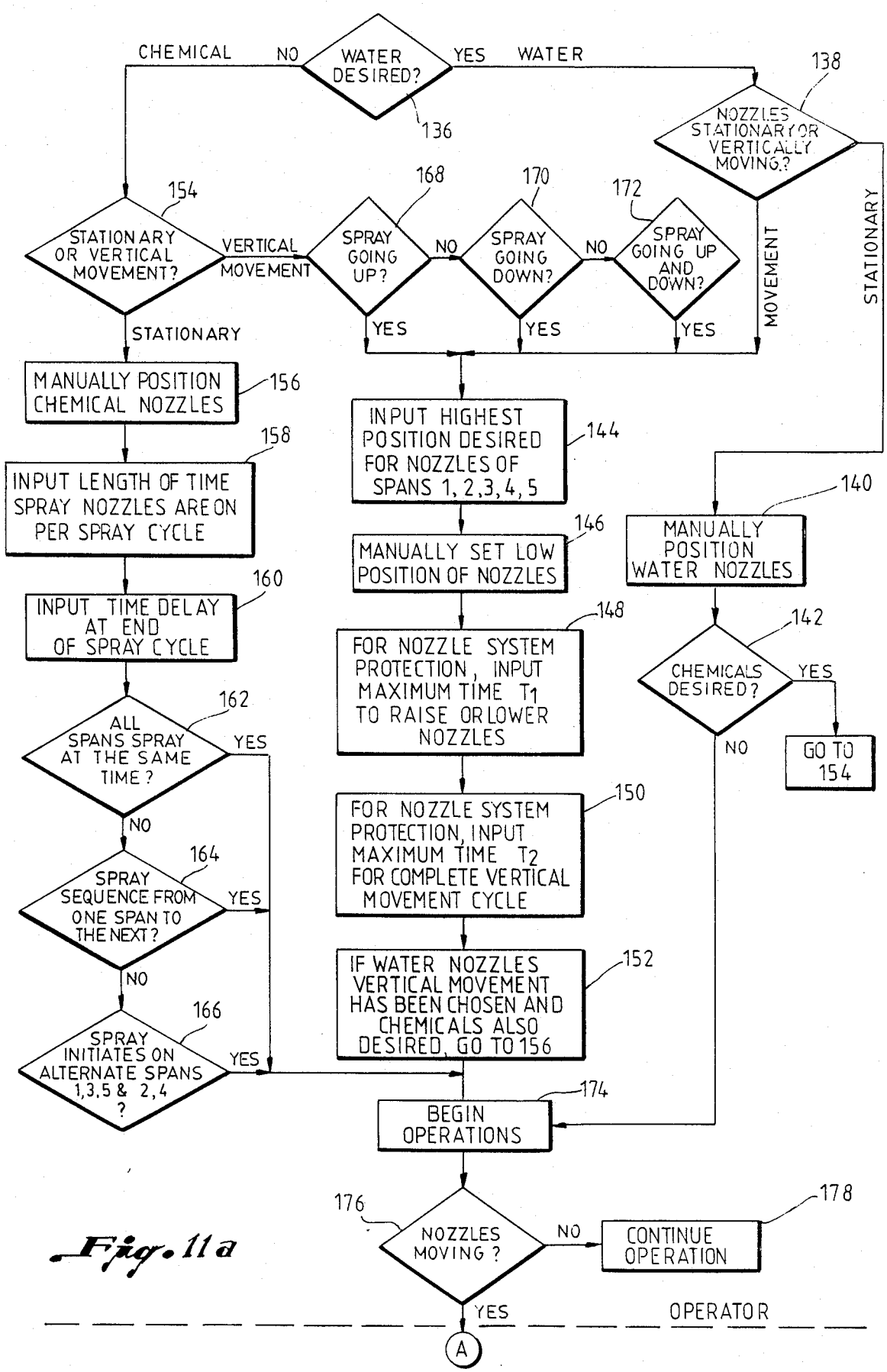
FIG. 11 is a flow chart detailing the operator and field inputs and internal system operation of the programmable controller.
Figure 11B:
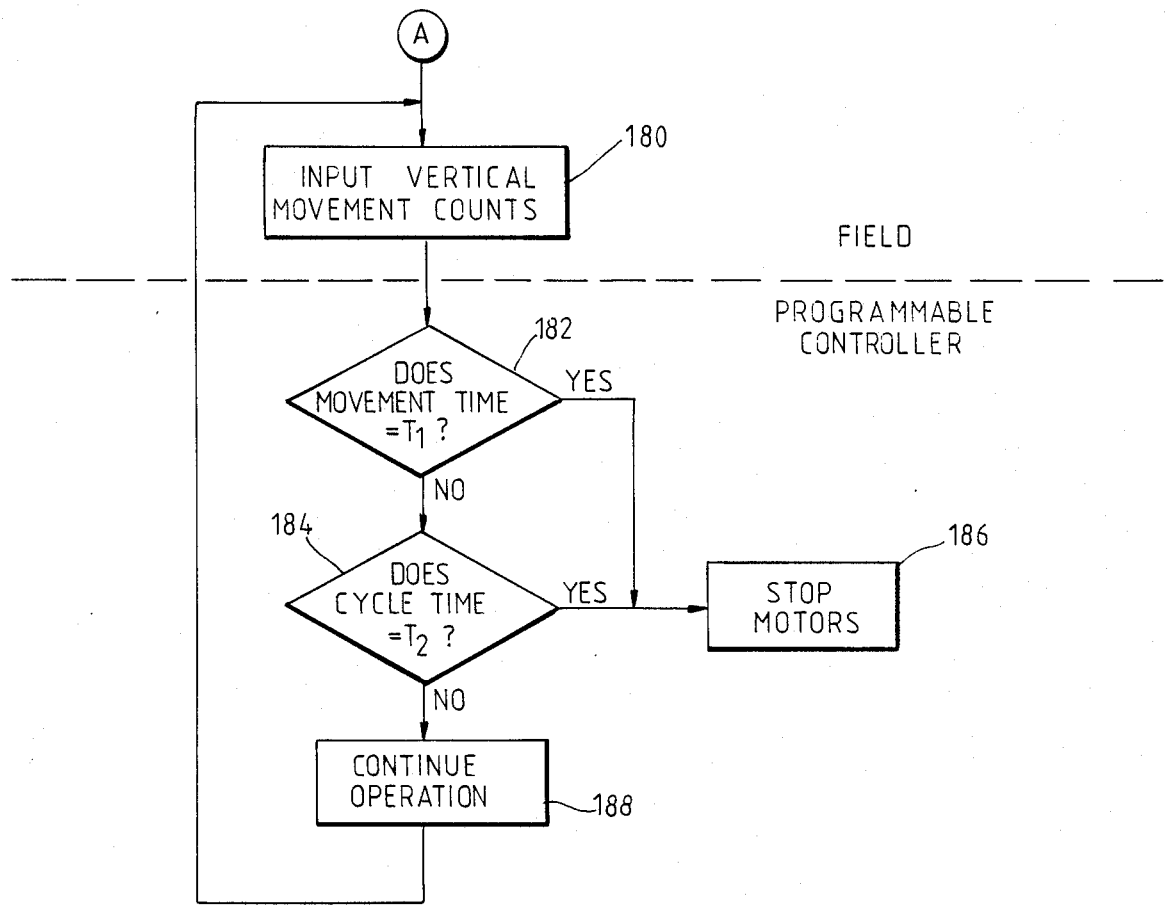

Applicants have used a Texas Instruments TI 5010 programmable controller in the preferred embodiment of their invention. However, a number of programmable controllers are available commercially which may be utilized to advantage. The programmable controller was programmed as follows. With reference to the flow chart shown in FIGS. 11a and b, the operator decides if he wants to dispense water 136. If he does, he then decides if he wants the nozzles to be stationary or moving vertically 138. If he chooses them to be stationary, he then positions the water nozzles 140 by manually starting and stopping the vertical motors. If he does not desire to disperse chemicals, 142, he then begins operation 174. If he desires to dispense chemicals, he selects stationary or vertical movement 154. If he desires that water nozzles be moving, he inputs the highest position desired 144 for the nozzles of spans 1, 2, 3, 4 and 5. He then manually sets the low position of the nozzles 146. Then, for nozzle system protection, he inputs the maximum time, $T_1$, in which the vertical motor should raise or lower the nozzles 148. For further protection, he inputs the maximum time, $T_2$, for the complete vertical movement cycle 150. If he is dispersing water only, he begins operation 174. If he also desires to disperse chemicals, he manually positions the chemical nozzles 156 by starting and stopping the vertical motors. He then inputs the length of time that the nozzles are spraying during each spray cycle 158, and the time delay at the end of the spray cycle 160. He then picks one of three operating modes: all spans spray at the same time 162, the spray sequences from one span to the next 164, or the spray initiates on alternate spans 1, 3, 5 and 2, 4 (166). He then begins operation 174. If the water nozzles are stationary, and the operator chooses to have the chemical nozzles moving vertically 154, he may then pick one of three possibilities: spray chemicals while the nozzles are going up 186, spray while the nozzles are going down 170, or spray while going up and down 172. The operator then inputs the high position 144, manually sets the low position 146, inputs $T_1$ 148, inputs $T_2$ 150, and begins operation 174. If no nozzles are moving 176, no internal checks are made 178. However, if nozzles are moving, the switches 118 send counts to the internal counters of the programmable controller to measure the vertical travel of the nozzles. The programmable controller does a safety check 182 to see if a given motor raised or lowered its nozzles within the safe time inputed 148, and also checks to see if a vertical cycle was completed 184 within the safe time inputed 150. If any one or more of the motors is not moving its nozzles within the time limits set, the motor is stopped 186 to prevent damage to the nozzle system. Otherwise, the programmable controller operates the nozzle systems 188 strictly according to the inputs of the operator.

It will be apparent to those skilled in the art who have the benefit of this disclosure that a number of variations may be made to the apparatus of the present invention. It is expected that these variations will be within the spirit and scope of the invention which is limited only by the following claims.

What is claimed is:

1. Apparatus for use in an irrigation system comprising:

three spaced towers on wheels operable to transport said towers through a field as a unit;

span structures connecting said towers in a preselected alignment;

an AC drive motor on each tower to drive a wheel of each tower;

a variable frequency AC motor controller operable to vary the speed of said motors in unison;

sensing means responsive to a variation in said alignment caused by one of said towers lagging behind or moving ahead of said other towers; and a switch responsive to said sensing means operable to stop said motor of said tower if ahead or stop motors of adjacent towers if one said tower is behind, until said alignment is re-established, then an electronic circuit to stop all said tower motors momentarily, then restart in unison.

2. Apparatus for use in low energy precision application irrigation comprising:

an elevated span section supportably connected to two spaced mobile towers;

separate water and chemical manifolds positioned along said span section adapted to receive water and chemicals from supply sources;

at least one flexible drop tube connected to each said separate manifold in a manner to receive liquid from said separate manifold for dispensing water of chemical form said separate manifold;

first positioning means to position all of said drop tubes for said chemical manifold in unison and independently of other said drop tubes vertically relative to a field without vertically repositioning said chemical manifold; and separate AC motor drive means for each said tower to propel said apparatus through said field at a selected speed.

3. Apparatus for use in low energy precision application irrigation as recited in claim 2, wherein:

said apparatus has a plurality of said span sections connected end-to-end, extending in a linear alignment across said field, and each pair of adjacent span sections is connected at their adjacent ends to one of said towers;

and further comprising control means to control independently the time interval during which chemical is dispensed from each said span section.

4. Apparatus for use in low energy precision application irrigation as recited in claim 3, wherein said first positioning means comprises:

a separate reel on said manifold mounted coaxially with its respective manifold for each said drop tube;

rotation means to independently rotate each said manifold and its respective reels about their longitudinal axis for winding up or down said drop tubes on said reels; and control means associated with said rotation means to wind said drop tube up and down in an oscillatory sequence.

5. Apparatus for use in low energy precision application irrigation as recited in claim 4, wherein each said tower drive means comprises at least one wheel and an AC motor for driving said wheel; and further comprising a variable frequency controller operable to control uniformly the motor speed of all said tower motors.

6. Apparatus for use in low energy precision application irrigation as recited in claim 5, further comprising control means effective either:

when an individual said tower falls behind the other towers, to stop the motors of adjacnet towers until said linear alignment is re-established, stop all said tower motors and then accelerate all said towers at a uniform rate to said selected speed, or when an individual said tower moves ahead of the other towers, to stop the motor of said individual tower until said linear alignment is re-established, stop the motors of all said other towers, and then accelerate all said towers at a uniform rate to said selected speed.

7. Apparatus for use in low energy precision application irrigation as recited in claim 6, further comprising:

a separate truss structure positioned along each said span section and interposed between said span section and said manifolds to support said manifolds; and means connected to said structure operable to move said manifold back and forth between said support towers.

8. Apparatus for use in low energy precision application irrigation, as recited in claim 2, further comprising a second positioning means to position all of said drop tubes for said water manifold in unison and independently of other said drop tubes vertically relative to said field without vertically repositioning said water manifold.

9. Apparatus for use in low energy precision application irrigation as recited in claim 2 in which said first positioning means in operable to cycle said drop tubes for chemical between two vertically spaced positions.

10. Apparatus for use in low energy precision application irrigation as recited in claim 9, further comprising means to dispense chemical while said drop tubes cycle between said vertically spaced positions.

11. An irrigation system comprising:

a plurality of elongate span sections interconnected with each other end-to-end and supported by a plurality of mobile, wheeled towers;

a separate AC motor to drive each said tower;

means for uniformly regulating the speed of said towers in a manner effective to substantially maintain said interconnected span sections in alignment substantially perpendicular to a predetermined path of travel;

a separate chemical nozzle system and a separate water nozzle system supported by each said span section;

each said chemical nozzle system and water nozzle system including a manifold positioned along each said span section, at least one flexible drop tube for each said manifold connected at a first end to said manifold in a manner to receive water or chemicals, and a dispensing nozzle connected at the other end of each said flexible drop tube;

transport means for independently transporting water and liquid chemicals along the length of said interconnected span sections and into said plurality of nozzle systems for separately dispensing water and liquid chemicals;

horizontal movement means for independent movement of each said separate chemical nozzle system and water nozzle system horizontally along each said span section;

vertical movement means for moving said nozzles on said drop tubes vertically relative to said field, said nozzles on any one said nozzle system moving in unison and independently of nozzle movement on another said nozzle system; and means for independently controlling the amounts of chemical and water dispensed.

12. An irrigation system as recited in claim 11, wherein said means for uniformly regulating the speed of said towers comprises a first variable frequency controller for controlling the speed of all said AC motors in unison.

13. An irrigation system as recited in claim 12, further comprising:

a control platform having a drive wheel and a separate electric drive motor for said wheel positioned on each side of said control platform; and a second variable frequency controller for regulating the speed of one of said separate drive motors relative to the other said drive motor in a manner effective to substantially maintain said control platform on said predetermined path at a substantially constant operator-selected speed.

14. An irrigation system as recited in claim 13, further comprising a programmable control means for controlling the flow of liquid chemicals from each said chemical nozzle system independently.

15. An irrigation system as recited in claim 12 wherein said vertical movement means includes:

a separate reel on each said manifold mounted coaxially with its respective manifold for each drop tube;

rotation means to independently rotate each said manifold and its respective reels about their longitudinal axis for winding up or down said drop tubes on said reels; and programmable control means associated with said rotation means to wind said drop tubes up and down.

16. An irrigation system as recited in claim 15, further comprising programmable control means for controlling the flow of liquid chemicals from each said chemical nozzle system independently.

17. An irrigation system as recited in claim 16 wherein said programmable control means further controls the dispensing of chemicals from each said chemical nozzle system in synchronization with the movement of each said nozzle system.

18. Apparatus for use in a low energy precision application irrigation system comprising:

a row of towers in a side-by-side spaced relation mounted on drive wheels adapted to move said towers in unison in the same direction along a field;

an elevated span member interconnecting and supported by each pair of adjacent towers;

an AC motor on each tower to drive the drive wheel for said tower;

a variable frequency controller which communicates with each said tower motor so all said tower motors operate at the same speed;

a sensor to detect a misalignment of any one tower in said row of towers to the other towers in said row; and means responsive to said sensor to correct said misalignment by
(i) stopping the movement of said one tower along said field when said one tower is ahead of said other towers,
(ii) stopping the movement of adjacent towers along said field when said one tower is behind said other towers, until said misalignment is corrected, stopping all said tower motors, then restarting all said motors in unison, and acclerating all said motors uniformly to said same speed.

19. Apparatus for use in low energy precision application irrigation system as recited in claim 18, including:

at least one elevated manifold supported by and extending along said row of towers, said manifold adapted to convey a liquid;

at least one vertically disposed conduit between each pair of adjacent towers connected at one end to said manifold to convey liquid from within said manifold to the other end of said conduit;

a separate vertically and horizontally moveable nozzle at said other end of each said conduit to dispense said liquid; and means for moving said conduit and said nozzle vertically in an oscillating manner between two vertically spaced positions relative to said field.

20. Apparatus for use in low energy precision application irrigation system as recited in claim 19 in which said manifold is rotatable about its longitudinal axis; and each said vertically disposed conduit is sufficiently flexible to wind up on said manifold when the manifold is rotated in one direction and to unwind from said manifold when the manifold is rotated in the opposite direction.

21. Apparatus for use in low energy precisions application irritgation system as recited in claim 20 in which said apparatus has two separate, elevated manifolds, each said manifold adapted for receiving and carrying a separate liquid and having its own separate vertically disposed conduits and nozzles; and programmable control means capable of selectively directing the flow of liquid to said conduits disposed between any given pair of adjacent towers.

22. Apparatus for use in low energy precision application irrigation system as recited in claim 21 in which each said motor is reversible; and further comprising means to cycle said conduits between two vertically spaced positions while dispensing liquid.

23. Apparatus for use in low energy precision application irrigation system as recited in claim 22 including:

a wheeled platform connected along one side to the tower on one end of said row of towers;

an AC motor on said platform to drive said platform at a selected speed;

steering means to steer said platform in a predetermined direction;

a sensing device to detect a difference in the advance in said direction of said row of towers relative to said platform; and a speed regulator responsive to said sensing device to reduce said difference in advancement by changing the speed of all said tower means in relation to said platform motor until said difference has been corrected.

24. Apparatus for use in low energy precision application irrigation system as recited in claim 23 in which said wheeled platform has two motors, a first of said motors adapted to drive a wheel on a first side of said platform and the second of said motors adapted to drive a wheel on the second side of said platform; and said steering means comprises a sensing mechanism to detect a departure of said platform from said direction of movement advance along said field, and a third speed regulator responsive to said sensing mechanism to vary the speed of said second motor on said platform in relation to said first motor on said platform to reduce said departure by changing the rate of movement of one side of said platform in relation to the other side of said platform until said departure has been corrected.

25. Apparatus for use in low energy precision application irrigation system as recited in claim 20, further comprising a programmable control means for sequencing the vertical oscillatory movement of said nozzles, which occurs in response to rotating said manifold.

26. Apparatus for use in low energy precision application irrigation system as recited in claim 25, wherein said programmable control means are adapted to synchronize spraying of liquid from said nozzle in each said manifold independently while said manifold rotates to change the vertical position of said nozzles from a first vertical position to a second vertical position.

27. Apparatus for use in low energy precision application irrigation systems comprising:

a control platform with a plurality of wheels, and first and second alternating current motors, said first and second motors being independently coupled to drive wheels on opposite sides of said platform, the first of said motors being operated at a predetermined substantially constant speed;

a first AC motor controller operable to control the speed of said second motor;

means for sensing deviation of said platform from a predetermined path, said sensing means operable to cause said first AC motor controller to vary the speed of said second motor as required to correct said deviation;

a plurality of interconnected elongate span sections connected at one end to said control platform;

a plurality of wheeled towers supporting said span sections, each of said towers being provided with a AC motor to drive a wheel of said tower;

a second AC motor controller operable to control the speed of all the motors of said towers;

means for sensing misalignment between said control platform and said interconnected span sections operable to cause said second motor controller to control the speed of all said motors of said towers as required to correct misalignment between said control platform and said interconnected span sections;

said span sections being provided with switches at said tower either to (1) stop the motors of adjacent towers when an individual tower falls behind the adjacent span sections and their towers, stopping the motors of all towers after correct alignment is re-established and then accelerating all of said towers at a uniform rate to the speed determined by said second motor controller, as modified by said means for sensing misalignment between said control platform and said interconnected span sections, or (2) stop the motor of an individual tower when said tower moves ahead of the adjacent span sections and their towers, stopping the motors of all towers after correct alignment is re-established, and then accelerating all of said towers at a uniform rate to the speed determined by said second motor controller, as modified by said means for sensing misalignment between said control platform and said interconnected span sections;

a plurality of rotatable chemical manifolds supported from said span section, each span section being provided with at least one rotatable chemical manifold;

means for transporting a chemical along said span sections and into said rotatable chemical manifolds at a desired pressure;

a plurality of rotatable water manifolds supported from said span section, each span section being provided with at least one rotatable water manifold;

means for transporting water along said span sections and into said rotatable water manifolds;

means for regulating water pressure in said rotatable water manifolds to a level effective in low energy precision application irrigation techniques;

means for independently positioning said rotatable chemical manifolds and said rotatable water manifolds in a horizontal plane substantially perpendicular to said predetermined path and substantially parallel to said span section;

said rotatable chemical manifolds and said rotatable water manifolds being provided with a plurality of flexible drop tubes in fluid communication with said rotatable chemical manifolds and said rotatable water manifolds, each of said flexible drop tubes terminating in a nozzle;

said rotatable chemical manifolds and said rotatable water manifolds being provided with means for storage of said flexible drop tubes when said nozzles are raised by rotation of said rotatable chemical manifolds and said rotatable water manifolds;

programmable control means for rotating said rotatable chemical manifolds and said rotatable water manifolds independently of each other, thereby separately controlling the timing and amplitude of the oscillations of the chemical application nozzles and the water application nozzles in a plane substantially perpendicular to said span sections and substantially parallel to said motorized towers; and programmable control means for selectively supplying said liquid chemicals separately to each rotatable chemical manifold at a predetermined time.

* * * * *

UNITED STATES PATENT AND TRADEMARK OFFICE
CERTIFICATE OF CORRECTION

PATENT NO. : 4,763,836

DATED : August 16, 1988

INVENTOR(S) : William M. Lyle and James P. Bordovsky

It is certified that error appears in the above-identified patent and that said Letters Patent are hereby corrected as shown below:

Column 11, line 28, change "of" to --or--.

Column 11, line 29, change "form" to --from--.

Column 12, line 5, change "adjacnet" to --adjacent--.

Column 14, line 31, change "precisions" to --precision--.

Signed and Sealed this

Fourteenth Day of February, 1989

Attest:

DONALD J. QUIGG

Attesting Officer

Commissioner of Patents and Trademarks